United States Patent
Okazaki et al.

[11] Patent Number: 5,831,947
[45] Date of Patent: Nov. 3, 1998

[54] AUTOMATIC MEDIUM CHANGING APPARATUS USING AN AUTOMATIC REGULATOR ACCORDING TO THE DISK TYPE

[75] Inventors: Yukinori Okazaki, Hirakata; Makoto Fujita, Ikoma; Yoshio Umeda, Kobe, all of Japan

[73] Assignee: Matsushita Electric Industrial Co., Ltd., Osaka-fu, Japan

[21] Appl. No.: 712,763

[22] Filed: Sep. 12, 1996

[30] Foreign Application Priority Data

Sep. 12, 1995 [JP] Japan .................................. 7-233730

[51] Int. Cl.⁶ ........................................................ G11B 7/00
[52] U.S. Cl. ................................................ 369/34; 369/58
[58] Field of Search .................................. 369/32, 58, 54, 369/94, 275.3, 34; 360/69

[56] References Cited

U.S. PATENT DOCUMENTS

| 5,289,451 | 2/1994 | Ashinuma | 369/58 |
| 5,463,602 | 10/1995 | Oka | 369/34 |
| 5,553,044 | 9/1996 | Tanaka | 369/58 |
| 5,617,386 | 4/1997 | Choi | 369/34 |
| 5,633,842 | 5/1997 | Nishida et al. | 369/34 |
| 5,657,301 | 8/1997 | Yoshikawa et al. | 369/34 |

FOREIGN PATENT DOCUMENTS

| A-0420209 | 4/1991 | European Pat. Off. . |
| A-2575857 | 7/1986 | France . |
| 63-064632 A | 3/1988 | Japan . |
| 05314624 A | 11/1993 | Japan . |
| 07320391 A | 12/1995 | Japan . |

*Primary Examiner*—Nabil Hindi
*Attorney, Agent, or Firm*—Panitch Schwarze Jacobs & Nadel, P.C.

[57] ABSTRACT

In an automatic medium changing apparatus capable of storing a multiplicity of optical disks, the control parameters required for the drive control system of a drive unit for recording-reproducing are automatically regulated for all the combinations of the existing drive units and all the media held. The resulting values of the control parameters are stored in a control unit of the automatic medium changing apparatus and the apparatus is controlled by the corresponding control parameters transferred from the control unit at the time of processing the medium.

18 Claims, 8 Drawing Sheets

AUTOMATIC MEDIUM CHANGING APPARATUS USING AN AUTOMATIC REGULATOR ACCORDING TO THE DISK TYPE

FIELD OF THE INVENTION AND RELATED ART STATEMENT

1. FIELD OF THE INVENTION

The present invention relates to an automatic medium changing apparatus and a recording-reproducing apparatus for a plurality of optical disk media which are used only for read operation or capable of both write and read operations such as a CD-ROM, an magneto-optical disk and a phase change optical disk.

2. DESCRIPTION OF THE RELATED ART

In recent years, recording capacity and the recording/reproducing (write/read) speeds of the optical disk medium have greatly increased. As a result, the optical disk medium has been closely watched as an external memory for computers and also as image processing medium. An automatic medium changing apparatus (hereinafter referred to as the auto-changer) capable of managing and operating a great amount of data using an optical disk medium has been commercialized.

Limited installation space demands a compact auto-changer. In compliance with this demand, an auto-changer has been suggested so that a plurality of media are held in a tray for an improved holding efficiency and easier operation.

A conventional auto-changer will be described below.

Figure 8:
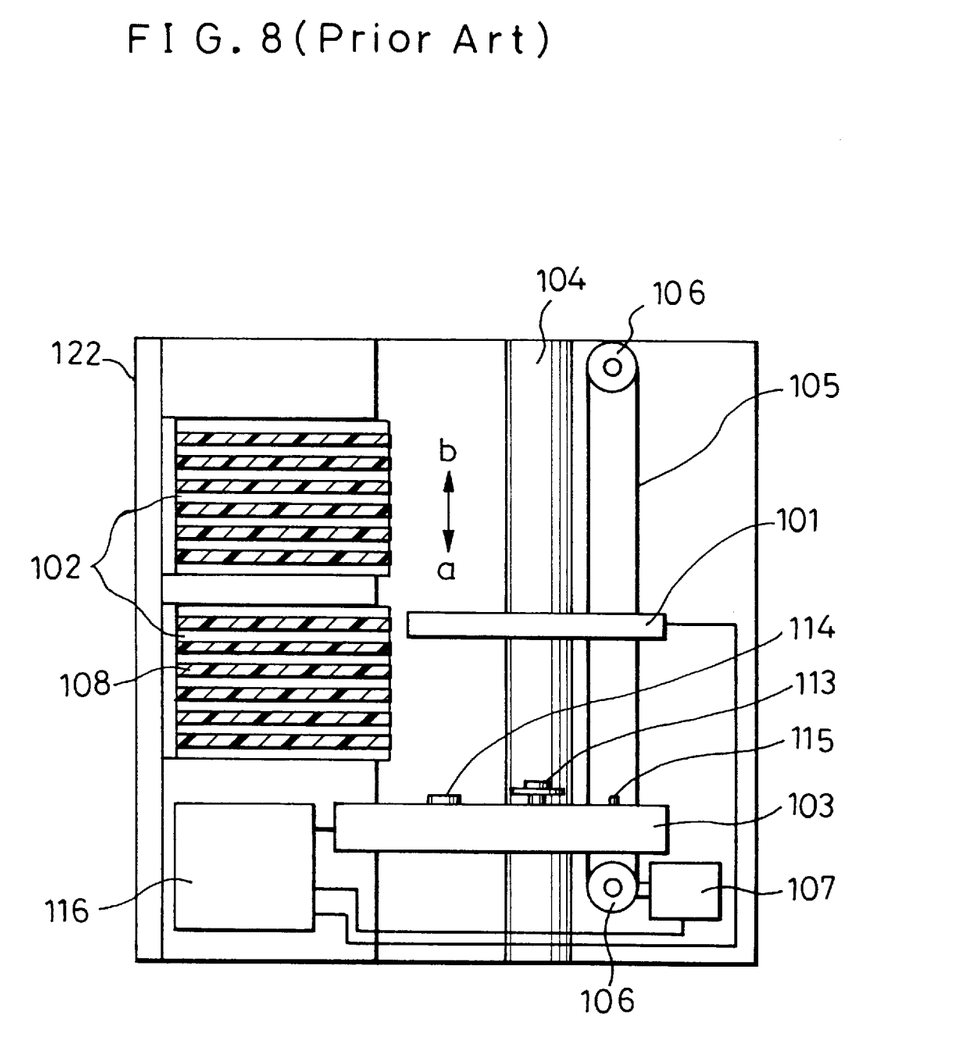
FIG. 8 is the diagram showing the configuration of the conventional auto-changer.

FIG. 8 is a side view showing an internal structure of an example of a conventional auto-changer. In FIG. 8, a tray transport unit 101 takes out a tray 108 on which media (not shown) are held in a magazine 102 and moves in the direction of arrow a, so that the media are transported to a drive unit 103 for recording-reproducing the media. The tray transport unit 101 is guided by a guide shaft 104, and driven by a drive motor 107 through a belt 105 and a pulley 106.

Figure 9:
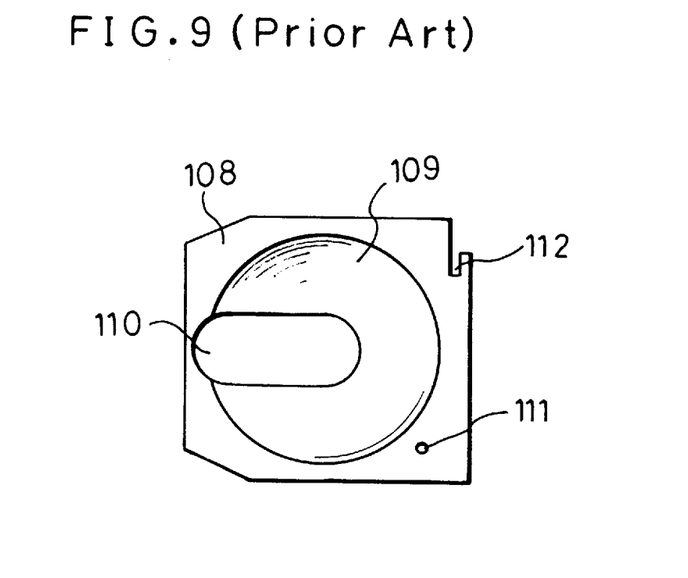
FIG. 9 is the plan view of the conventional tray.

FIG. 9 is a plan view of the tray 108. As shown in FIG. 9, the tray 108 is formed to have a medium holding recess 109. Also, the tray 108 is formed to have an opening 110 into which a turn table 113 and a pickup 114 of the drive unit 103 are adapted to be inserted. The tray 108 has a positioning hole 111 for setting the drive unit 103 in proper position, and a notch 112 used by the tray transfer unit 101 to retrieve/insert the medium from and into the magazine 102.

Also, the drive unit 103 provided in the auto-changer includes the turn table 113 adapted to rotate with a medium loaded on the turn table 113, the pickup 114 for reading a signal from the medium, and a positioning pin 115 corresponding to the positioning hole 111 of the tray 108.

A control unit 116 is arranged in the auto-changer. The control unit 116 controls a drive motor 107, the tray transport unit 101 and the drive unit 103. The control unit 116 also controls the operation of the auto-changer on the basis of the inputs entered by way of a host computer (not shown) or an operating button (not shown), and manages the medium information.

Next, the operation of a conventional auto-changer will be explained.

Explanation will be made on the case that a reproducing command for mounting a specific medium held in the magazine in the drive unit 103 is issued to the control unit 116 from an external source. First, the control unit 116 outputs a reproducing command signal to the drive motor 107 and the tray transport unit 101. As a result, the tray transport unit 101 is driven by the drive motor 107 through the belt 105 along the direction of arrow a or b and thus moves to a position corresponding to the designated tray 108. The tray transport unit 101 then takes out the designated tray 108 from the magazine 102 using advantage of the notch 112.

The tray transport unit 101 holding the designated tray 108 moves along the direction of arrow a, so that the positioning hole 111 of the tray 108 is caused to engage the positioning pin 115 of the drive unit 103. As a result, the tray 108 is set in position with respect to the drive unit 103. In this stage, the control unit 116 outputs a reproducing command signal to the drive unit 103. Consequently, the turn table 113 and the pickup 114 of the drive unit 103 advance into the opening 110 of the tray 108. At the same time, the medium placed on the tray 108 is arranged to be centered on the turn table 113. Then, the clamp unit (not shown) of the tray transport unit 101 fixes the designated medium on the turn table 113. After that, the turn table 113 rotates and signals are read out by the pickup 114. In this reproduction mode, the tray 108 is set in position by the drive unit 103, and held by the tray transport unit 101 at a position out of contact with the medium.

The tray 108 is returned in the following manner after reproduction.

As in the above-mentioned reproduction operation, the control unit 116 outputs a return command signal and stops the turn table 113 of the drive unit 103. And the tray transport unit 101 is moved by the drive motor 107 along the direction of arrow b. Then, the medium is released from the turn table 113, and the tray 108 with the medium placed thereon is transferred to a predetermined position in the magazine 102. The medium is thus returned to the magazine 102 using the notch 112.

Next, explanation will be made on the management of the medium (the presence or absence of a medium, the type of medium, the contents recorded in the medium, etc.) conducted by the auto-changer.

The user opens the door 122, inserts the magazine 102 and closes the door 122. Then the control unit 116 detects the signal from a door sensor (not shown) and outputs a management command signal to the tray transport unit 101. The tray transport unit 101 takes out all the trays 108 sequentially and detects by a sensor (not shown) whether a medium is placed on the tray 108 or not.

In some cases, the tray 108 is transferred to the drive unit 103, and the medium is placed on the drive unit 103 to determine the type of medium, or write the recording data or the management information of the medium. These media information can be stored in the control unit 116, whereby the information about the holding position, type and content of the medium can be used to issue an operation command when exchanging the medium. This series of operations is called an initializing operation, which is performed when power is switched on, the user changes the magazine 102, or the host computer issues an operation command for the initializing operation.

In addition to an auto-changer of magazine/tray type, another auto-changer for holding a plurality of cartridges each holding one medium is also widely used.

In such an auto-changer, the cartridges are taken out and held one by one through a mail slot (as a mechanism for inserting/discharging the cartridge into or from the auto-changer) formed in the auto-changer. Therefore, the controller is kept informed of which cartridge is held in which position. As a consequence, the controller has performed the initializing operation only for the cartridges newly inserted.

Next, the drive unit used for the conventional auto-changer will be explained with reference to FIG. 10.

Figure 10:
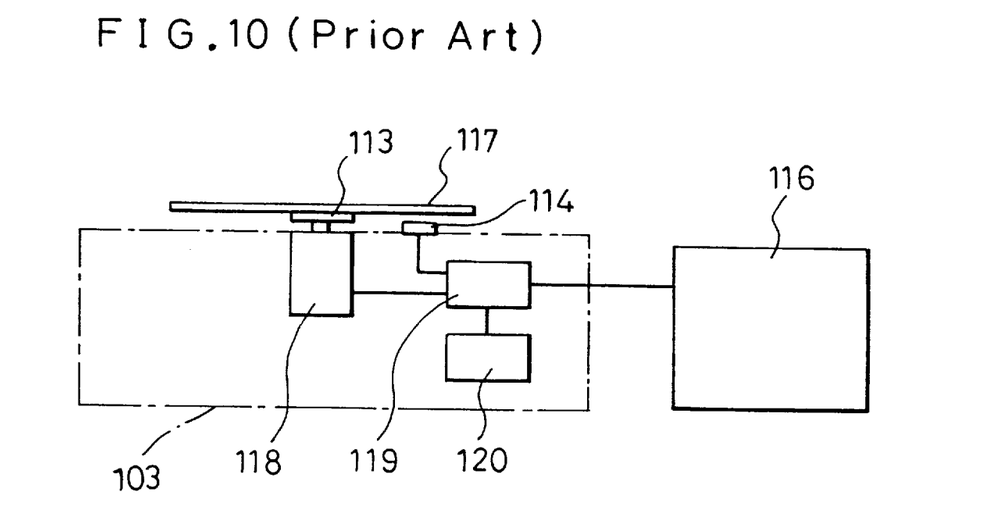
FIG. 10 is the detailed diagram showing the conventional recording-reproducing unit.

FIG. 10 is a diagram schematically showing an internal configuration of the drive unit 103 of FIG. 8.

In FIG. 10, a disk 117 as a medium is mounted on the turn table 113 is rotated by a spindle motor 118, and a drive controller 119 controls the operation of the pickup 114 and the spindle motor 118. At the same time, the drive controller 119 receives a signal from the pickup 114. The drive controller 119 operates in accordance with the command from the control unit 116 of the auto-changer, transfers the data read in accordance with the command, and reports the current state of the drive unit 103. An automatic regulator 120 is performs automatic regulation of the drive controller 119 for accurately detecting the information on the disk 117.

Next, the operation of the drive unit 103 will be explained in detail.

When the disk 117 is clamped on the turn table 113 of the drive unit 103, the drive controller 119 drives the spindle motor 118 thereby to start rotating the disk 117. In this operation, the pickup 114 is driven according to the variations in reflectance or clamping position of the disk 117. In this drive control operation, the signal may not be read at all in some cases if fixed control parameters are used. Even if the signal can be read to some degree, it would be impossible to control the pickup 114 accurately. As a result, error rate of the detected signal becomes high or repeated read operations are required. The conventional drive unit, therefore, has the problem that long time is consumed for reading or transferring the data.

In view of this, various automatic regulation systems have been suggested to accommodate the variations of the disk etc. Examples are disclosed in the gazette of the Japanese unexamined patent application hei 1-89034 (Tokkai hei 1-89034) and the gazette of the Japanese unexamined patent application hei 7-153106 (Tokkai hei 7-153106).

The automatic regulator 120 shown in FIG. 10 is used for accommodating the variations mentioned above. This automatic regulator 120 has the function of automatically regulating the control parameter required for reading the data from the disk 117 with the highest accuracy by means of a learning algorithm.

The drive controller 119 reads the data from the disk 117 after the optimum control parameter is set by the automatic regulator 120.

The conventional auto-changer having the above-mentioned configuration, however, leads to the following problem.

Specifically, in the above-mentioned conventional apparatuses, it is indispensable that automatic regulation is operated in consideration of reflectance of the disk or the clamping position. In this learning algorithm, however, the steps of applying a test signal and adjusting to an optimum parameter are required to be repeated several times. The result is the problem that it takes a very long time after the disk is clamped until data can be actually read.

The auto-changer requires the time for the automatic regulation as long as for the tray transfer from the magazine to the drive unit no matter how rapidly the tray carrying the disk thereon is transferred to the drive unit. The overall operating efficiency of the apparatus, therefore, is unavoidably deteriorated. Also, since this operation is performed each time a disk is set, even if it has learned about a disk A, the drive unit must again learn about a disk B when it is set. Even when the disk A is set the second time, further learning is required again because the previous learning data has disappeared. Also, even when the control parameter is stored for the disk previously regulated, the data cannot be read from the disk before the automatic regulation is completed. It therefore cannot be known which of the loaded disks corresponds to the previously learned disk.

Consequently, in the conventional drive unit, learning is required each time of automatic regulation, and therefore it takes a long starting time from setting a disk to reading data therefrom. The auto-changer using such an algorithm is low in operating efficiency. This problem presents itself very conspicuously especially in an environment where the apparatus is connected with a network for operation.

Further, the conventional drive unit is a drive apparatus meeting the requirement of only one of the recording and reproducing operations. The auto-changer is adapted to drive either a medium which can be reproduced only or a medium which can be both recorded and reproduced. Demand is high, therefore, for an auto-changer which can operate with both a read-only medium such as the CD-ROM now closely watched and an optical disk medium capable of both read and write operations.

OBJECT AND SUMMARY OF THE INVENTION

The object of the present invention is to solve the above-mentioned problems and to provide an automatic medium changing apparatus and a recording-reproducing apparatus having a high operating efficiency capable of processing both a read-only medium and a read-write medium in a short time before reading data.

In order to achieve the above-mentioned object, according to the present invention, the apparatus is provided with an automatic medium changing apparatus (hereinafter referred to as the auto-changer) which can manages the information about the media (disks) in the auto-changer, as well as information about recording-reproducing unit in the auto-changer. The auto-changer of the present invention comprises a recording-reproducing unit having the information manageable and capable of processing both a read-only medium and a read-write medium, a holding unit for holding the media, a medium transfer unit for transferring the medium from the holding unit to the recording-reproducing unit, and a management controller for controlling the recording-reproducing unit and the medium transfer unit and for managing the medium. The recording-reproducing unit includes an automatic regulator for automatically regulating control parameters required for reproducing or recording the medium signal and holding the regulated control parameters when the medium is placed on the recording-reproducing unit, and the management controller stores control parameters regulated and held by the automatic regulator and the corresponding management discrimination information on the corresponding media and the corresponding recording-reproducing unit.

The above-mentioned configuration permits the control parameter once learned to be reused and therefore eliminates the time required for relearning the same combination. The starting time for processing the disk medium thus is shortened, thereby improving the overall operating efficiency of the apparatus and the system connected with the apparatus.

The auto-changer in accordance with the present invention comprise a recording-reproducing unit capable of accommodating and processing both a read-only medium and a read-write medium, a holding unit for holding the media, a medium transfer unit for transferring a medium from the holding unit to the recording-reproducing unit, and a management controller for managing and controlling the recording-reproducing unit, the medium transfer unit and the medium. The recording-reproducing unit includes an automatic regulator which, when the medium is placed on the recording-reproducing unit, automatically regulates the control parameters required for reproducing or recording the signal of the medium and holds the control parameters thus regulated. The management controller is adapted to store the control parameters automatically regulated and held by the automatic regulator of the recording-reproducing unit for the medium transferred and placed by the medium transfer unit. The management controller also stores the management discrimination information on the corresponding medium and the corresponding recording-reproducing unit. By this configuration, a read-only medium and a read-write medium can both be processed, held and exchanged, and the starting time for processing the disk medium is reduced, with the result that the overall operating efficiency of the apparatus and the system connected with the apparatus can be improved.

While the novel features of the invention are set forth particularly in the appended claims, the invention, both as to organization and content, will be better understood and appreciated, along with other objects and features thereof, from the following detailed description taken in conjunction with the drawings.

It will be recognized that some or all of the Figures are schematic representations for purposes of illustration and do not necessarily depict the actual relative sizes or locations of the elements shown.

DESCRIPTION OF THE PREFERRED EMBODIMENTS

[First embodiment]

Figure 1:
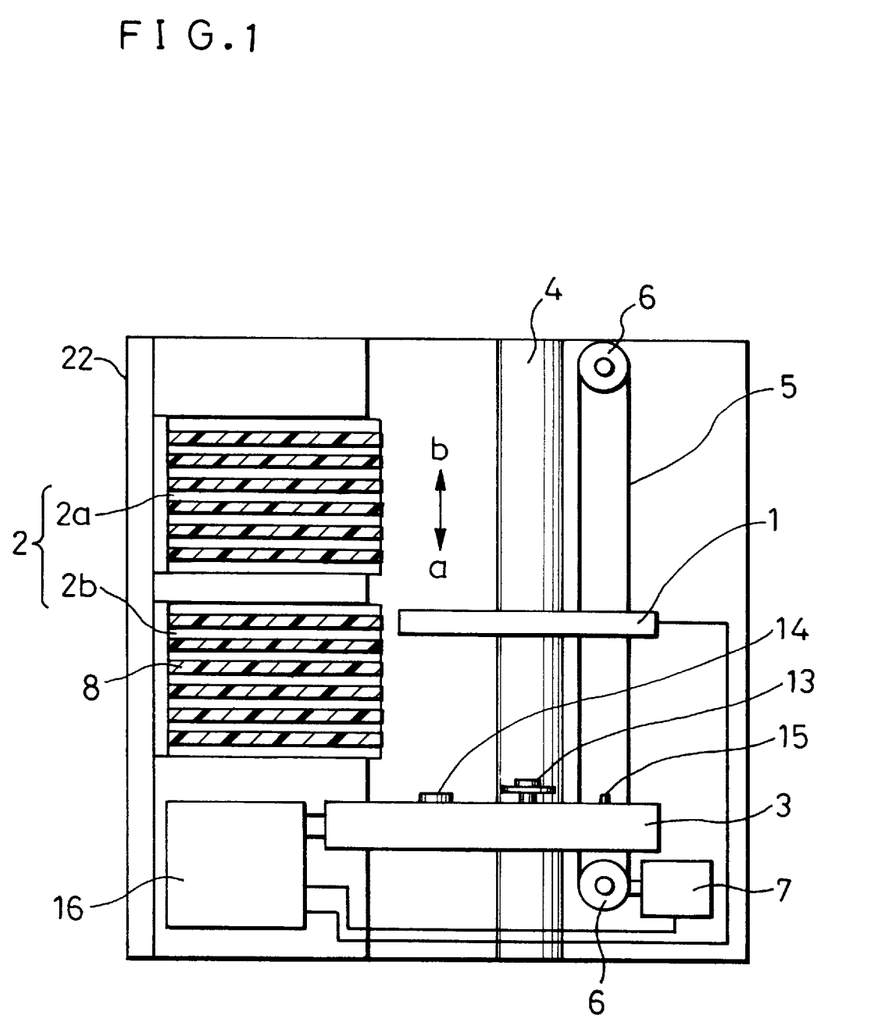
FIG. 1 is a diagram showing a configuration of an auto-changer of a first embodiment in accordance with the present invention.
Figure 2:
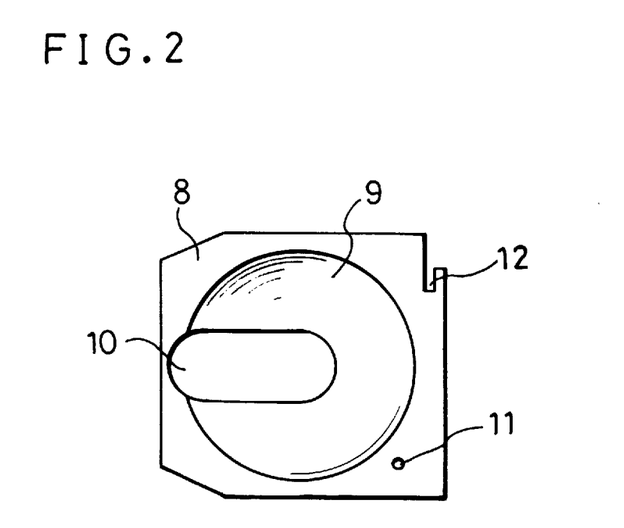
FIG. 2 is a plan view showing a tray of the first embodiment.
Figure 3:
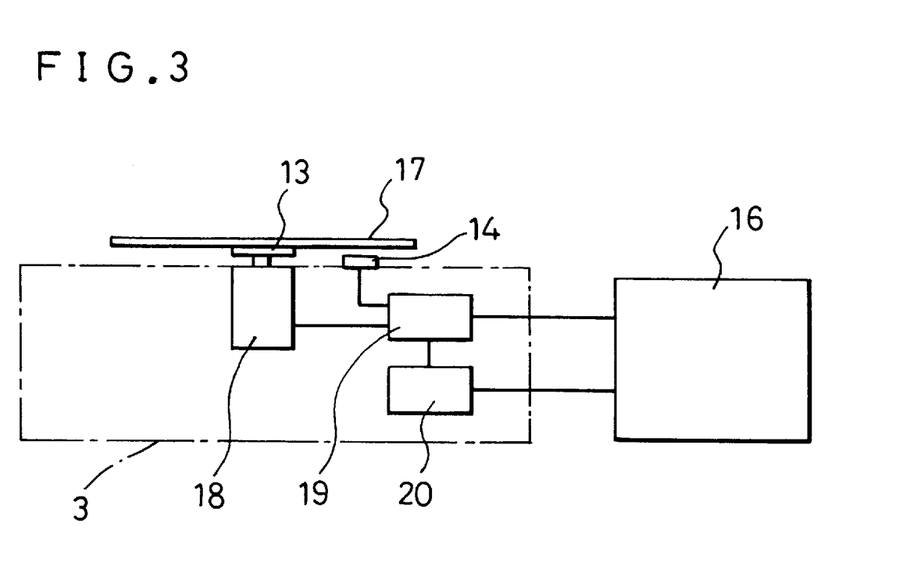
FIG. 3 is a detailed diagram showing a recording-reproducing unit of the first embodiment.
Figure 4:
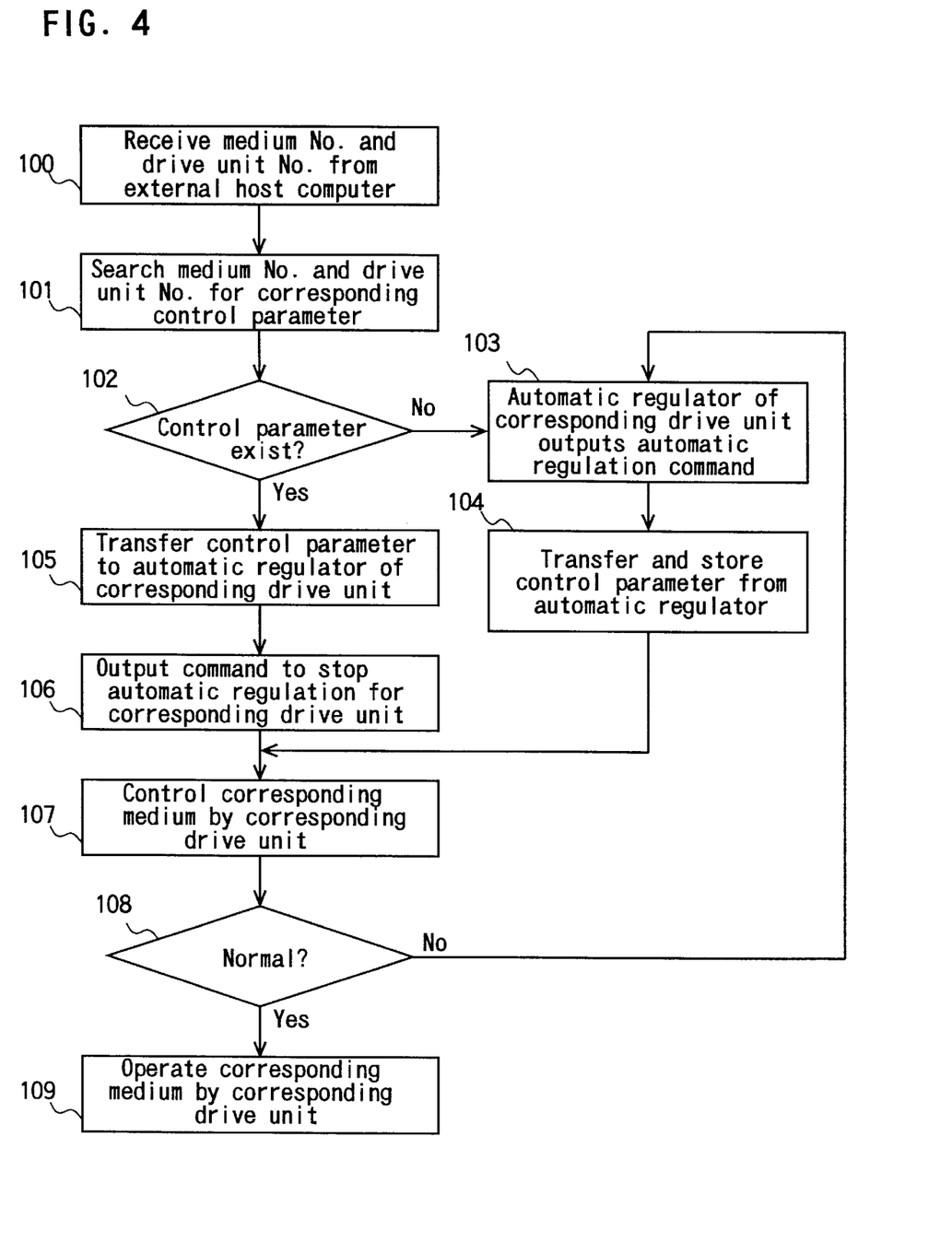
FIG. 4 is a flow chart for explaining the initializing operation of the first embodiment.

A first embodiment in accordance with the present invention will be described below with reference to FIGS. 1, 2, 3 and 4. FIG. 1 is a diagram showing a configuration of an automatic medium changing apparatus (hereinafter referred to as the auto-changer) of the first embodiment. FIG. 2 is a plan view of a tray 8 of the first embodiment. FIG. 3 is a block diagram showing a configuration of a recording-reproducing unit 3 of the first embodiment. FIG. 4 is a flow chart for explaining the initializing operation of the first embodiment.

In FIG. 1, a medium or tray transfer unit 1 takes out the tray 8 carrying a medium (not shown) such as an optical disk, a magneto-optical disk or a phase change optical disk in a holding or magazine unit 2. The tray transfer unit 1 moves along the direction of arrow a and transfers the tray 8 to a recording-reproducing unit (hereinafter referred to as drive unit) 3. The drive unit 3 is guided by a guide shaft 4, and driven by a drive motor 7 through a pulley 6 and a belt 5.

As seen from FIG. 2, the tray 8 is formed to have a recess 9 for holding a medium. Also, the tray 8 has an opening 10 which is inserted by a pickup 14 and a turn table 13 of the drive unit 3 at recording-reproducing, a positioning hole 11 for setting the tray in position with respect to the drive unit 3, and a notch 12 used by the tray transfer unit 1 for taking out or inserting the medium from or into the magazine 2.

Also, the drive unit 3 provided in the auto-changer has a turn table 13 adapted to rotate with a medium mounted thereon, a pickup 14 for reading a signal from the medium, and a positioning pin 15 corresponding to the positioning hole 11 of the tray 8.

A management control unit 16 in the auto-changer controls the driving operation of a drive motor 7, the tray transfer unit 1 and the drive unit 3. The control unit 16 also controls the operation of the auto-changer and manages the medium information in accordance with the information from a host computer (not shown) or operating buttons (not shown).

FIG. 3 is a diagram schematically showing an internal configuration of the drive unit 3 of FIG. 1. In FIG. 3, the same component parts as those in FIG. 1 are designated by the same reference numerals, respectively, and will not be described any further.

In FIG. 3, a disk 17 is a medium, a spindle motor 18 rotates the turn table 13, and a drive controller 19 controls the driving operation of the pickup 14 and the spindle motor 18 and receives a signal from the pickup 14. The drive controller 19 operates in response to a command from the control unit 16 of the auto-changer, and has the functions of transferring the data read in accordance with the command and reporting the conditions of the drive unit 3.

An automatic regulator 20 operates to automatically regulate the control parameters used by the drive controller 19 for controlling the driving operation of the spindle motor 18 and the pickup 14 in order to accurately detect the information on the disk 17.

Next, explanation will be made about the operation of the auto-changer for exchanging the medium.

Assume that an external command is input to the control unit 16 for mounting and processing a specific disk on the drive unit 3. First, the control unit 16 outputs a reproduction command signal to the drive motor 7 and the tray transfer unit 1. Then, the tray transfer unit 1 is driven by the drive motor 7 along the direction of arrow a or b through the belt 5 and moves to the position corresponding to the tray 8 carrying the designated disk. The tray transfer unit 1 takes out the tray 8 carrying the designated disk from the magazine 2 taking advantage of the notch 12. Next, the tray transfer unit 1 now holding the tray 8 moves in the direction of arrow a, and causes the positioning hole 11 of the tray 8 to engage with the positioning pin 15 of the drive unit 3. The tray 8 thus is set in position with respect to the drive unit 3. At this time, the control unit 16 outputs a command signal to the drive unit 3, so that the turn table 13 and the pickup 14 of the drive unit 3 advance into the opening 10. In this operation, the medium placed on the tray 8 is centered on the turn table 13, and fixed on the turn table 13 by means of a clamp (not shown) arranged on the tray transfer unit 1. After that, the turn table 13 rotates and the disk signal is read out by the pickup 14.

In t his reproduction operation, the tray 8 is set in position by the drive unit 3 and held in the tray transfer unit 1 at a height not in contact with the disk.

The tray 8 that has completed the reproduction operation is returned as described below.

Like in the above-mentioned reproduction operation, the control unit 16 outputs a return command signal and thus causes the turn table 13 of the drive unit 3 to s top. After that, the tray transfer unit 1 is moved by the drive motor 7 along the direction of b. The disk is released from the turn table 13, and transferred to a predetermined position in the magazine 2 while being placed on the tray 8. The tray transfer unit 1 returns the disk to the magazine 2 taking advantage of the notch 12.

Next, explanation will be made on the operation of the drive unit 3 and the control unit 16 for processing the disk as a medium.

First, the medium management (as to the presence or absence of the medium, the medium type, the control parameters required for processing the medium, etc.) conducted in this auto-changer will be explained.

After the user opens the door 22, inserts the magazine 2 and closes the door 22, the control unit 16 detects the signal from a door operation sensor (not shown) and outputs a command signal. The tray transfer unit 1 supplied with this output signal takes out all the trays sequentially and detects the presence or absence of the medium therein by means of a sensor (not shown). The sensor detects whether a medium is placed on the tray 8 on the one hand and whether the medium is of a type that can be reproduced only or can be both recorded and reproduced on the other hand.

After that, the tray 8 on which the medium is placed is transferred to the drive unit 3 and placed on the drive unit 3. A command is issued to the drive controller 19 and the automatic regulator 20 of the drive unit 3 so that the control parameters are automatically regulated for the pickup 14 to read, write or erase the data on the medium. In other words, the control parameters are corrected to accommodate various variations or irregularities in the drive unit 3 for the optical disk, including the medium shape (warping and the like), characteristics variations (reflectance and the like) or eccentricity variations caused at the time of clamping.

In a regulation procedure, when the disk 17 constituting a medium is clamped to the turn table 13 of the drive unit 3, the drive controller 19 rotates the disk 17 by starting the drive motor 18. At the same time, the automatic regulator 20 automatically regulates the control parameters required for reading the data from the disk 17 with the highest accuracy by a learning algorithm incorporated for accommodating the variations and irregularities described above. After the optimum control parameters are set by the automatic regulator 20, the drive controller 19 is capable of processing data on the disk 17.

Then, among the control parameters to be regulated, those which are varied in accordance with the combination between the medium and the drive unit 3, for example, the focusing of the pickup, the tracking control gain, the optical output power, the tracking offset or the like informations are stored in the management control unit 16 together with the management discrimination information on the combination of the medium and the drive unit 3. This storage operation is performed sequentially for all the combinations of the medium and the drive unit 3 thereby to store the above-mentioned information. This entire series of operations, which is called the initializing operation, is performed when an initializing command is issued from the host computer or the apparatus is switched on.

Next, with reference to FIG. 4, explanation will be made on the procedure in which the medium is processed in the drive unit 3 in accordance with a command from an external source. FIG. 4 shows flow chart for initializing operation.

First, the control unit 16 receives a command to read, write or erase a predetermined medium by using a predetermined drive unit 3, as shown in FIG. 4 (step 100). The control unit 16 then searches for corresponding control parameters from the management information on the combination of the medium and the drive unit 3 (step 101).

The drive controller 19 of the drive unit 3 is adapted to select, in response to a command from an external source, either the automatic regulation mode or the drive control mode performed using the control parameter values held in the automatic regulator 20.

Also, the control parameters held in the automatic regulator 20 can be read or written from an external source. In the case where a control parameter is found to exist as a result of search by the control unit 16, such a control parameter is transferred to the automatic regulator 20 of the drive unit 3 (step 105). The control unit 16 issues a command to the drive controller 19 to cancel the automatic regulation and perform the control operation using the value transferred (step 106).

On the other hand, in the case where a control parameter conforming to a particular combination of the medium and the drive unit 3 cannot be extracted as a result of the search by the control unit 16, a command is issued to transfer the medium by the tray transfer unit 1 to the drive unit 3 and perform the automatic regulation (step 103).

A command is issued also to transfer the control parameter thus obtained to the control unit 16. After that, the medium is actually processed. Assume, however, that the medium cannot be normally processed under the control of the drive unit 3 using the control parameter held in the automatic regulator 20 and an error occurs. The control unit 16 issues a command to the drive controller 19 and the automatic regulator 20 to carry out the automatic regulation again (step 108). Then the medium is processed, and the control parameter newly obtained is stored together with the information on the medium and the drive unit 3.

When the disk 17 is actually processed as a medium on the drive unit 3, the time required for automatic regulation can be reduced considerably by the operation shown in FIG. 4. As a result, it is possible to provide an auto-changer which has a high overall operating efficiency of the system and thus saves the user waiting time considerably.

The present invention is not necessarily limited to a single drive unit as a recording-reproducing unit used in the embodiment, but a plurality of recording-reproducing units may be used with equal effect. In such a case, exactly the same effect as the above-mentioned embodiment can of course be obtained, the only difference being that the control parameters are learned for all the combinations of the medium and the recording-reproducing units.

[Second embodiment]

Figure 5:
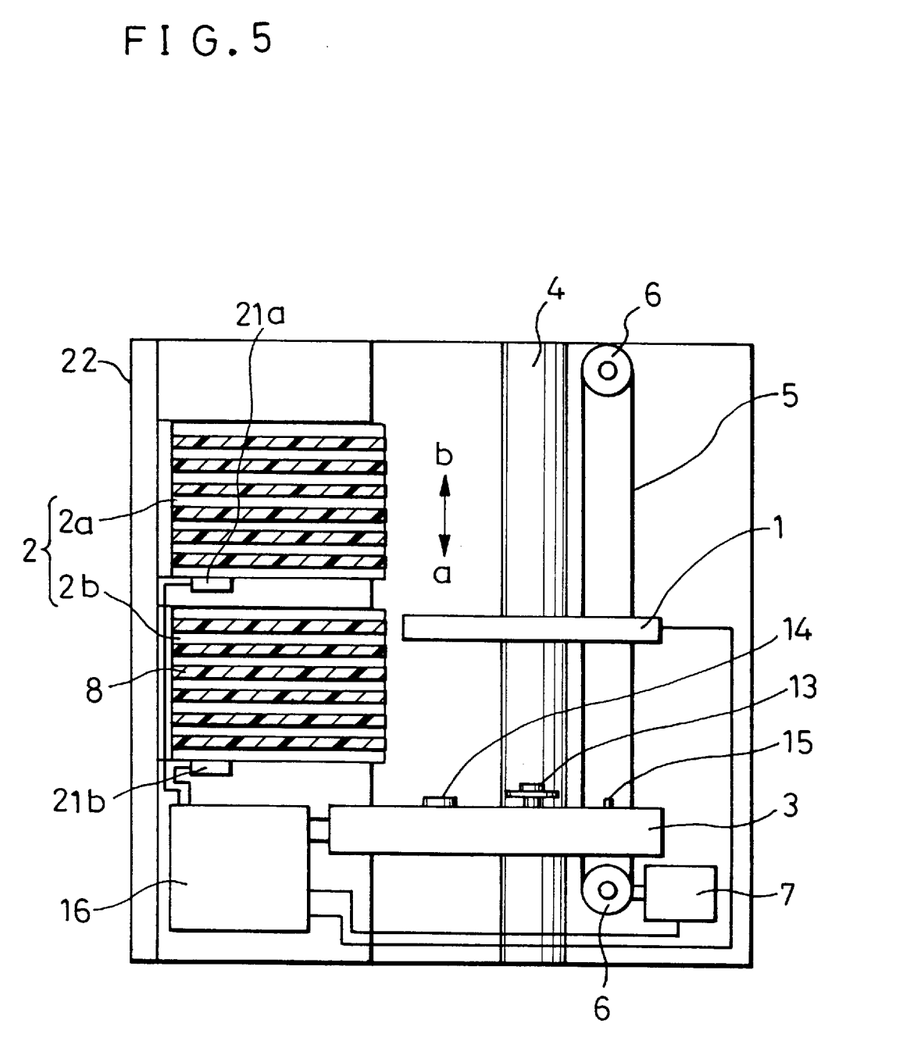
FIG. 5 is a diagram showing a configuration of an auto-changer of a second embodiment in accordance with the present invention.

Next, an auto-changer of a second embodiment in accordance with the present invention will be explained with reference to FIG. 5. FIG. 5 is a side view showing a configuration of the auto-changer of the second embodiment.

In FIG. 5, the same component parts as those in FIG. 1 will not be described in detail.

The tray transfer unit 1 takes out the tray 8 carrying the medium (not shown) in the upper and lower magazines 2 (2a, 2b), and transfers along the arrow a to the drive unit 3. The tray transfer unit 1 is guided by the guide shaft 4, and driven by the drive motor 7 through the pulley 6 and the belt 5. The magazines 2 (2a, 2b) contains a plurality of trays 8, and is so configured that the magazine can be freely replaced by the user opening and closing the door 22. Also, the upper and lower magazines 2a, 2b are provided with replacement sensors 21a, 21b for detecting the mounting and demounting of the magazines 2a 2b.

The initializing operation performed in this auto-changer when power is switched on or when a command is received from an external source is already described above with reference to the first embodiment of the present invent ion.

Next, explanation will be made on the operation performed when only the magazine 2a has been replaced by the user. In the case where the magazine 2a is replaced, the control unit 16 detects a signal from a replacement sensor 21a. At the same time, the signal of the replacement sensor 21b is monitored by the control unit 16, and control unit 16 confirms that the magazine 2b is not replaced. When confirming that the magazine 2b is not replaced, the control unit 16 performs the aforementioned initializing operation only on the tray 8 and the medium held in the replaced magazine 2a. The control unit 16 thus updates only the information on the medium contained in the magazine 2a (as to the presence or absence of the medium, the medium type, etc.) and the information on the control parameters for the combination of the medium and the drive unit 3. The existing information about the magazine 2b that has not be replaced is held as it is.

As described above, since the initializing operation is performed and the data are updated only for the magazine replaced, the time required for the initializing operation is considerably reduced. In addition, the starting time for processing the medium is greatly shortened. It is thus possible to improve the operating efficiency of the auto-changer and the overall operating efficiency of the system connected with the auto-changer.

Although a replacement sensor is used for detecting the replacement of the magazine of the second embodiment, the present invention is not necessarily confined to such a configuration. Instead, a replaced magazine replaced is designated by a host computer to give a command so as to perform the initializing operation only for that magazine.

Further, the starting time for processing the medium can be shortened by performing the initializing operation again for all the magazines and media, though not useful for reducing the time of the initializing operation. Such a method is effective especially when only a few number of magazines can be stored, since there is no need of adding a replacement sensor and the total time required of the initializing operation is not very long.

Also, instead of replacing the medium by a magazine in the second embodiment, the medium in an auto-changer can be held or managed by a tray or a cartridge. In such a case, the control parameters are updated each time of replacing a tray or a cartridge, as the case may be, thereby to shorten the starting time for disk processing and also the time required for the initializing operation.

As another alternative, the auto-changer may be equipped with a mail slot which the medium can be inserted into or removed from. This makes it possible for the control unit to determine which medium is replaced. The initializing operation, therefore, can be readily performed for the medium, cartridge or the magazine containing the medium replaced, and only the related control parameters can be updated.

Even with a plurality of drive units, the process similar to that for the above-mentioned embodiment is possible for a shorter starting time.

[Third embodiment]

Figure 6:
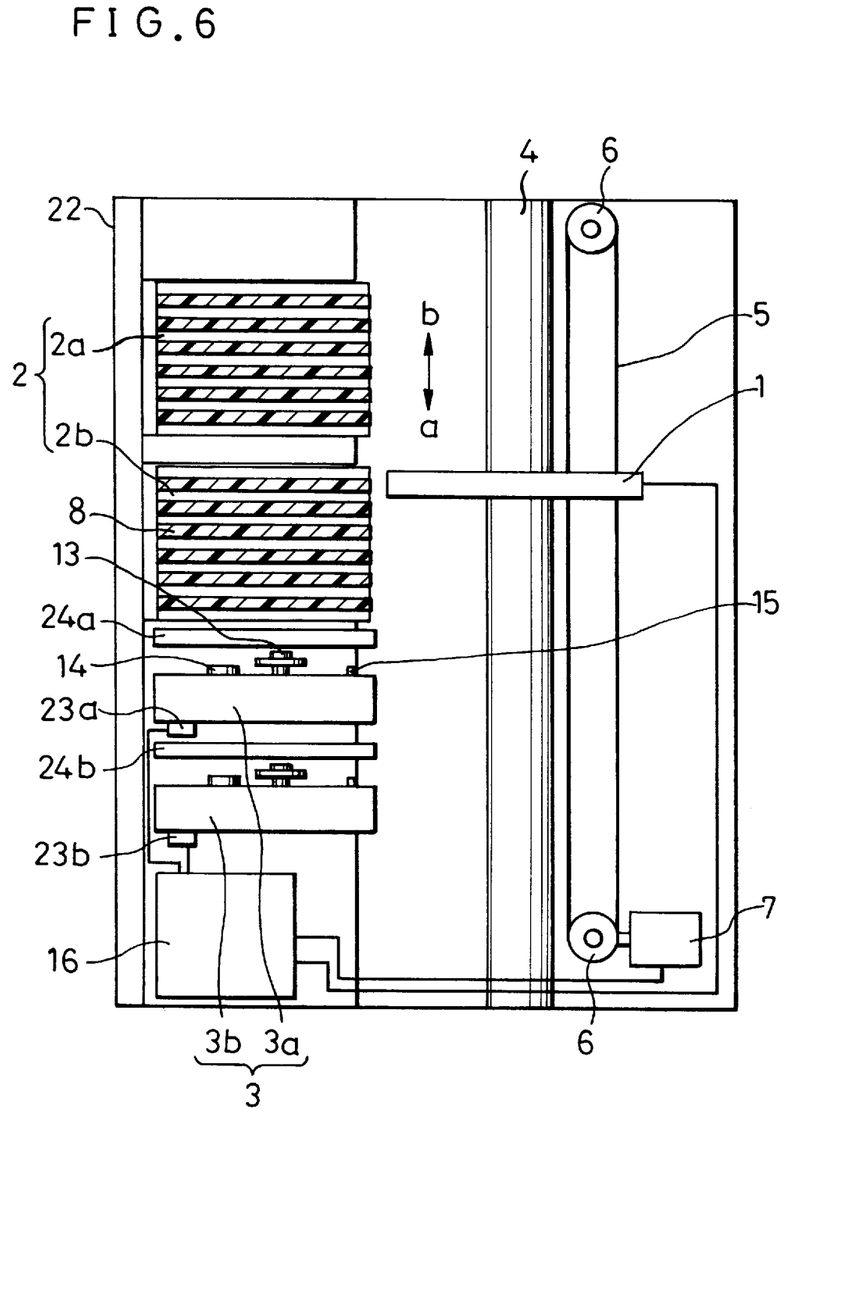
FIG. 6 is a diagram showing a configuration of an auto-changer of a third embodiment in accordance with the present invention.

Next, a schematic diagram showing an auto-changer of a third embodiment in accordance with the present invention is shown in FIG. 6. FIG. 6 is a side view showing a configuration of an auto-changer of the third embodiment.

The third embodiment is different from the first embodiment in that this embodiment comprises two drive units 3 (3a, 3b) which can be easily replaced by opening the door 22. Also, the auto-changer of the third embodiment comprise replacement sensors 23a, 23b for detecting the replacement of the drive units 3a, 3b to output a signal to the control unit 16 indicating whether the drive units 3a, 3b have been replaced. The auto-changer also comprises loading mechanism 24a, 24b for holding and setting the tray 8 in position with respect to the drive units 3a, 3b.

Next, the operation of the auto-changer of the third embodiment will be explained.

The explanation will be made only about the loading mechanisms 24a, 24b used for replacing the medium, in which the third embodiment is different from the first and second embodiments.

First, the tray transfer unit 1 carrying the tray 8 moves along the direction of arrow a and inserts the tray 8 into the loading mechanism 24a or 24b. The loading mechanism 24a or 24b causes the positioning hole 11 of the tray 8 to engage with the positioning pin 15 of the drive unit 3a or 3b, thereby setting the tray 8 in position with respect to the drive unit 3a or 3b. In this stage, the control unit 16 outputs a command signal to the drive unit 3a or 3b, so that the turn table 13 and the pickup 14 of the drive unit 3a or 3b advance into the opening 10 (FIG. 2). At the same time, the medium placed on the tray 8 is centered on the turn table 13, and is fixed on the turn table 13 by means of a clamp (not shown) of the loading mechanism 24a or 24b. After that, the turn table 13 rotates and the pickup 14 reads out the signal.

In this reproduction mode, the tray 8 is set in position on the drive unit 3a or 3b, and is held in the loading mechanism 24a or 24b at a height keeping out of contact with the medium.

The operation of returning the tray 8 is performed in the following manner upon completion of the reproduction operation. As in the reproduction operation mentioned above, the control unit 16 stops the turn table 13 on the basis of a return command signal, and thus releases the medium thus far clamped to the turn table 13. Also, the tray transfer unit 1 withdraws the tray 8 and the medium from the loading mechanism 24a or 24b. The tray 8 with the medium placed thereon is transferred to a predetermined position in one of the magazines 2 and thus returned to the magazine 2 using the notch 12.

The initializing operation performed for the auto-changer when power is switched on or in response to a command from an external source is the same as in the case of the aforementioned first embodiment.

Next, explanation will be made about the operation of replacing only the drive unit 3a. In the case where the drive unit 3a is replaced, the control unit 16 detects a signal from the replacement sensor 23a. At the same time, the signal of the replacement sensor 23b is monitored by the control unit 16. After confirming that the drive unit 3b is not replaced, the control unit 16 performs the initializing operation for all the combinations of the drive unit 3a and all the media contained therein. And only the information about the control parameters for the combinations of the respective media and the drive unit 3a are updated. In this process, the information about the drive unit 3b not replaced is held as it is.

As described above, the initializing operation is performed and data updated only for the drive unit 3a or 3b replaced. The time required for the initializing operation thus can be shortened considerably as well as the starting time for processing the medium. In this way, the operating efficiency of the auto-changer and hence the overall operating efficiency of the system connected to the auto-changer can be improved.

Although a replacement sensor is used for detecting the replacement of the drive units 3 (3a, 3b) in the third embodiment, the present invention is not necessarily limited to such a configuration. Instead, the drive unit 3 (3a, 3b) replaced may be designated by a host computer, for example, without using the replacement sensor, as in the case of the second embodiment.

Further, though not contributive to a shortened time of the initializing operation, the starting time for medium processing can be reduced by repeating the initialing operation for all the drive units 3 (3a, 3b). Such a method is especially effective as it eliminates the need of adding a replacement sensor when only a small number of drive units 3 (3a, 3b) are installed and also as it involves a comparatively short time for the initializing operation as a whole.

[Fourth embodiment]

Figure 7:
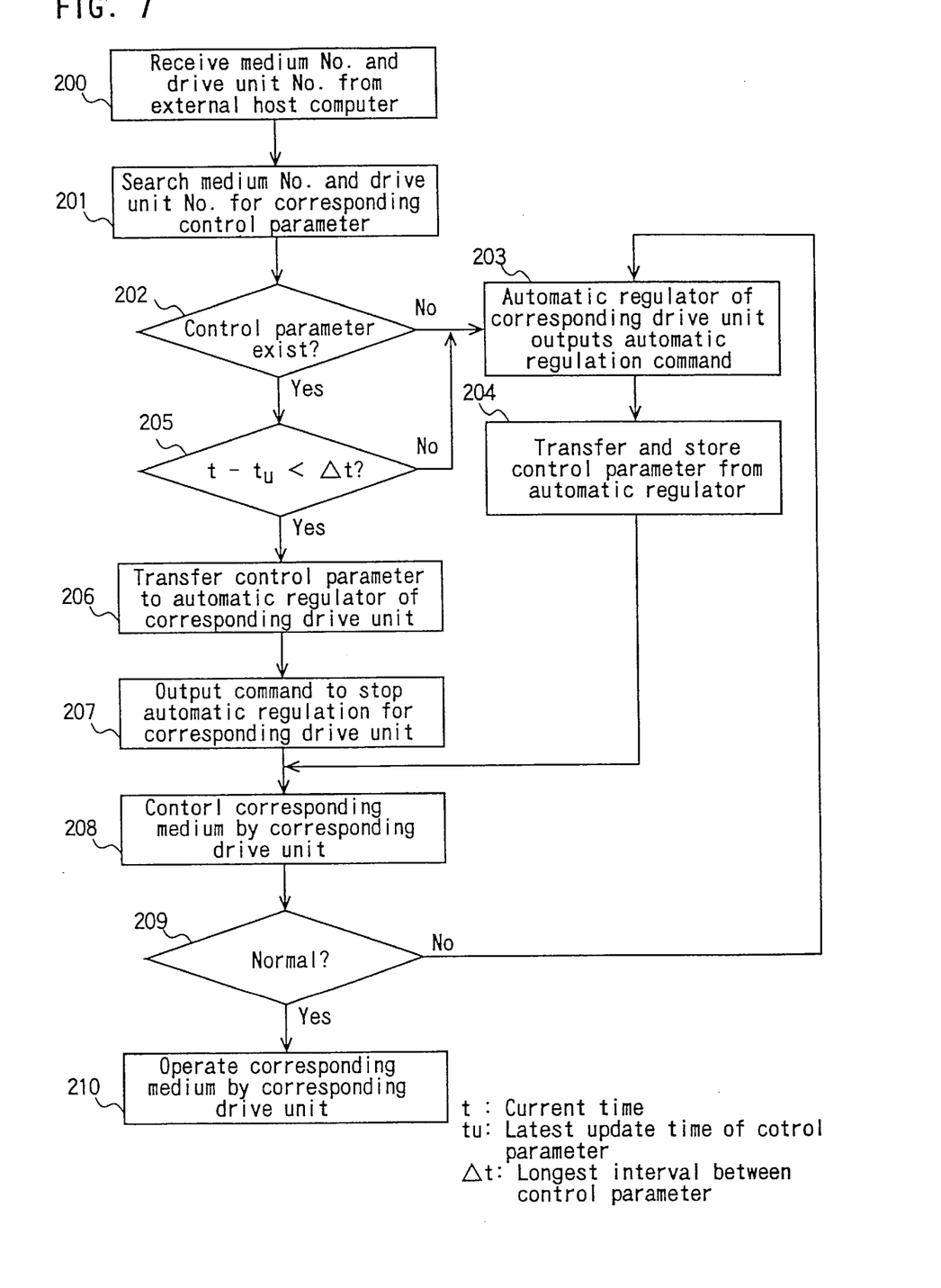
FIG. 7 is a flow chart for explaining the initializing operation of a fourth embodiment in accordance the present invention.

Next, a fourth embodiment of the present invention will be described with reference to FIG. 7. The configuration and the medium-changing operation of the fourth embodiment are the same as those of the aforementioned first embodiment and will not be described. The auto-changer of the fourth embodiment, however, is configured in such a manner that the control unit 16 stores both the control parameters and the time they are updated. FIG. 7 shows a flow of operation for the case in which the control unit 16 is instructed by an external device (such as a host computer) to process a predetermined medium in a predetermined drive unit 3.

First, as shown in FIG. 7, upon receipt of a command from an external source to process a predetermined medium by a predetermined drive unit 3, the control unit 16 searches the related management discrimination information for a corresponding control parameter and the latest update time tu (step 201).

In the presence of a corresponding control parameter, the control unit 16 checks that the time of lapse t−tu (from the latest update time tu and the current time t) is not longer than a predetermined time length (longest update interval: Δt) (step 205). After this check, the result is transferred to the automatic regulator of the drive unit 3 while at the same time cancelling the automatic regulation (step 207). The control unit 16 then issues a command to control the drive unit 3 by using the control parameter transferred (step 208).

On the other hand, in the absence of a corresponding control parameter in step 202 or in the case where Δt or more has passed from the previous time of updating or storing the control parameter in the presence of the control parameter, then the tray transfer unit 1 transfers the medium to the drive unit 3, and mounting the medium on the drive unit 3, issues a command for automatic regulation (step 203). The resulting control parameter is transferred and data updated.

The subsequent flow of operation is similar to that for the aforementioned first embodiment. As described above, secular or environmental variations can be accommodated by eliminating the use of the control parameter data that have passed a predetermined length of time. More specifically, an error occurring when old data are used for drive control without automatic regulation can be prevented, thereby providing a highly reliable auto-changer that can process a medium most quickly after all.

Though not shown in FIG. 7, the fourth embodiment can be configured to involve the following flow of operation. In the case where the control unit 16 has a buffer memory and the control parameter value is updated after the lapse of a predetermined time following the previous update, the value updated is compared with the previous value not updated. In the case where the difference is not less than a predetermined value, the medium or the drive unit 3 may be deteriorated. The result, therefore, is indicated on the display section of the auto-changer or transferred as a message to the host computer to call its attention.

Further, according to the above-mentioned fourth embodiment, the time that has elapsed from the latest update of the control parameters is calculated only after receiving a medium-processing command from an external host computer. The present invention is not necessarily confined to such a configuration. Instead, the control unit 16 may check the latest update time of the stored control parameters at regular time intervals of Δtc, for example, and if there are any data that has elapsed a predetermined time (Δt) or more before the current time, the automatic regulation is conducted again for the particular combination thereby to update the control parameter data.

[Fifth embodiment]

Next, a fifth embodiment in accordance with the present invention will be explained. The configuration and the medium-changing operation of the fifth embodiment are the same as those of the aforementioned first embodiment, but the difference of the fifth embodiment lies in the initializing operation. According to the first embodiment, the initializing operation is performed when power is switched on or in compliance with an external command, and automatic regulation is performed by the number of combinations of all the media contained in the auto-changer and the drive unit. And, in the first embodiment, the control parameters are stored in the control unit 16 in advance.

In the fifth embodiment, by contrast, the control parameters are never automatically regulated during the initializing operation. Assume that an external host computer or the like issues a command to process a specific medium in a predetermined drive unit. The operation is the same as when the control parameters are absent as shown in FIG. 4, if the particular combination has not been experienced and has been realized for the first time. In such a case, the control unit 16 performs the automatic regulation and stores the control parameters at the that time.

As described above, according as the process proceeds, the control unit 16 steadily comes to learn the control parameters for various combinations of the medium and the drive units.

Also, according to the fifth embodiment, in the case where the magazine, the medium (including the cartridge) or the tray is replaced as described in the second or third embodiment or in the case where the drive unit is replaced, the control unit 16 clears the data stored therein in relation to the control parameters for the magazine or the drive unit replaced. The above-mentioned automatic regulation is performed only at the time of processing for the combination using a newly-held medium or a new drive unit.

Even when a predetermined time has passed from the learning of the control parameters as described in the fourth embodiment, the only related operation is to clear the corresponding data. This configuration makes it unnecessary to perform the time-consuming practice for mounting the medium on the drive unit, conducting automatic regulation and acquiring the control parameters for all the combinations at regular time intervals, at the time of changing the medium or the drive unit or at the time of the first initializing operation. As a result, an auto-changer configuration is made possible in which the user can immediately start operating the auto-changer with the operating efficiency progressively improved as the starting time is steadily shortened.

[Sixth embodiment]

Next, a sixth embodiment of the present invention will be described. The component elements and the medium-changing operation of the sixth embodiment are exactly the same as those for the aforementioned third embodiment. According to the sixth embodiment, the initializing operation, the control parameters to be stored in the initializing operation and the method for generating the control parameters in the processing operation of the medium are different from those for the third embodiment. More specifically, according to the third embodiment, the control parameters are automatically regulated first during the initializing operation for all the combinations of the media stored and the drive units in the same manner as for the first embodiment, and the resulting control parameters are stored. With the increase in the number of drive units installed for holding the media or the number of media held, however, the more control parameters are used, resulting in an increased memory consumption, often leading to an increased cost or an increased apparatus size. The sixth embodiment will be described with reference to a method for producing the same effect as the aforementioned embodiments with a smaller capacity of memory in spite of an increased number of media held or the number of drive units used.

In the sixth embodiment, assume that N drive units are mounted on the auto-changer and M media are held.

In the first to fifth embodiments described above in which the initializing operation is performed somewhat differently from each other, it is basically necessary to acquire and store the control parameters for all the combinations of media and the drive units by automatic regulation. The management information thus stored are as many as N×M sets, of which the control parameters are represented as following Matrix 1 with (drive unit No. and medium No.):

$$
\begin{matrix}
(1,1), & (1,2), & \ldots, & (1,M) \\
(2,1), & (2,2), & \ldots, & (2,M) \\
\cdot & \cdot & & \cdot \\
\cdot & \cdot & & \cdot \\
\cdot & \cdot & & \cdot \\
(N,1), & (N,2), & \ldots, & (N,M)
\end{matrix}
\qquad \text{[Matrix 1]}
$$

A corresponding method in accordance with the sixth embodiment will be described below.

(1) A reference drive unit (called the drive unit K for the sake of convenience) is selected from all the N drive units, and all the media (1 to M) are sequentially transferred to the drive unit K, so that the related control parameters are automatically regulated and stored. The medium information (medium No., presence or absence of the medium, the medium type, etc.) are also of course stored at the same time. At this timing, therefore, M sets of management information are stored, for which the control parameters are given as

[Matrix]

$$(K,1), (K,2), \ldots (K,M)$$

(2) Next, one reference medium (medium L) is selected and transferred sequentially to the drive units 1 to M (except for K), and the control parameters described below are obtained by automatic regulation and stored.

[Matrix]

$$(1,L), (2,L), \ldots (K-1,L), (K+1,L), \ldots (N,L)$$

Only those parameters having the values listed in Matrixes 2 and 3 above are stored, and constitute data in the number of M+N−1. This indicates that memories required in the sixth embodiment are (N−1)×(M−1) fewer than in the method shown in the first to fifth embodiments.

(3) Next, in the case where a medium j is processed by a drive unit i, for example, a control parameter (i,j) is obtained in the following-described manner. Specifically, $$(i,j)=(K,j)+(i,L)-(K,L) \qquad (1)$$

The control parameter (i,j) is forwarded to the automatic regulator of the corresponding drive unit and is used for drive unit as in the first to fifth embodiments, thereby shortening the starting time remarkably.

As described above, according to the method of the sixth embodiment, the same effect is obtained with a fewer memory capacity. Also, a fewer number of media are actually mounted and used for automatic regulation at the time of initializing operation, and therefore the initializing operation can be completed within a shorter time.

Also, unlike the sixth embodiment in which the control parameter is obtained by a difference as shown in Equation 1 above, the control parameter may alternatively be obtained in the following manner.

$$(i,j)=(K,j)\times(i,L)/(K,L) \qquad (2)$$

The control parameter can be generated even more accurately by appropriately changing the method depending on drive characteristics and the medium variations.

Also, instead of the linear computation as in Equation 1 or 2 described above, nonlinear equations may be used incorporating the respective features depending on the drive unit and medium variations and characteristics. As a result, the accuracy of the control parameters is further improved.

In the above-mentioned embodiment, the control parameters were stored in the form of Matrix 2 or 3 above and the control parameters used for processing media are acquired from Equation 1 or 2. Without using Matrix 3, however, the control parameters can alternatively be stored as difference information in advance as given below.

$$\delta(i,L)=(i,L)-(K,L) \qquad (3)$$

In this way, when a control parameter is generated, the following equation may 4 be used.

$$(i,j)=(K,j)+\delta(i,L) \qquad (4)$$

This fact becomes apparent by comparing Equations 1 and 4. Many other variations of the method of storing and acquiring the control parameters are considered available. For example, control parameters are variously generated for combinations of a reference medium and a plurality of drive units on the one hand and combinations of a reference drive unit and a plurality of media on the other. When the control parameters are generated in this way, the starting time is reduced while decreasing the memory capacity used. The use of the resulting parameters can complete the initializing operation within a short time.

According to the first to fourth embodiments and the sixth embodiment, the control parameters are automatically regulated for each combination of drive units and media at the time of initializing operation. In the fifth embodiment, by contrast, the control parameters are automatically regulated by progressive learning. The present invention is not limited to either mode, however, but one of the two modes can be incorporated selectively. In this way, the configuration is changed appropriately in accordance with the application and propensity of each user or the number of drive units or media used. The optimum operation can thus be realized to meet various operating environments for an improved operating efficiency.

The storage means used for storing the control parameters or the like data in the control unit in the first to sixth embodiments may be configured of a nonvolatile memory. Then the memory contents are not erased at the time of power failure or the like happening but can still be used as they are. Consequently, the time-consuming initializing operation is not required and the time before the system is restored is shortened, leading to an improved operating efficiency.

Further, apart from the auto-changer of tray/magazine type described with reference to the first to sixth embodiments, the invention is applicable with completely equal effect to a tray-type or a cartridge-type auto-changer without any magazine.

Furthermore, the first to sixth embodiments use the drive unit capable of processing both a read-only medium and a read-write medium. The present invention, however, is not necessarily limited to such a configuration. The use of a reproduction apparatus capable of processing only a read-only medium or a recording-reproducing apparatus capable of processing only a read-write medium, even though the advantage is lost of the possibility of processing the two types of media in a single apparatus, considerably shortens the starting time and improves the overall operating efficiency of the system including the recording-reproducing apparatus.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. An automatic medium changing apparatus comprising:
   a recording-reproducing unit capable of carrying and processing selected one of a read-only medium and a read-write medium;
   a holding unit for holding said medium;
   a medium transfer unit for transferring said medium from said holding unit to said recording-reproducing unit; and
   a management controller for managing and controlling said recording-reproducing unit, said medium transfer unit and said medium;
   wherein said recording-reproducing unit includes an automatic regulator for automatically regulating the control parameters required for reproducing or recording a signal of said medium and holding the regulated control parameters when said medium is placed on said recording-reproducing unit, and said management controller includes means for storing the control parameters automatically regulated and held by said automatic regulator and the management discrimination information for the corresponding medium and said recording-reproducing unit.

2. An automatic medium changing apparatus comprising:
   (a) a recording-reproducing unit capable of carrying and processing selected one of a read-only medium and a read-write medium;
   (b) a holding unit for holding said medium;
   (c) a medium transfer unit for transferring said medium from said holding unit to said recording-reproducing unit; and
   (d) a management controller for managing and controlling said recording-reproducing unit, said medium transfer unit and said medium;
   wherein said recording-reproducing unit includes an automatic regulator for automatically regulating the control parameters required for reproducing or recording a signal of said medium and holding the regulated control parameters when said medium is placed on said recording-reproducing unit, and said management controller includes means for storing the control parameters automatically regulated and held by said automatic regulator and the management discrimination information for the corresponding medium and said recording-reproducing unit and in the case where said management controller processes a medium in said recording-reproducing unit, the management discrimination information on said medium and said recording-reproducing unit is searched for a corresponding control parameter, said control parameter, if stored, is transferred to said automatic regulator, and a command is issued to said recording-reproducing unit to process said medium using the control parameter transferred without being automatically regulated by said automatic regulator.

3. An automatic medium changing apparatus comprising:
   (a) a recording-reproducing unit capable of carrying and processing selected one of a read-only medium and a read-write medium;
   (b) a holding unit for holding said medium;
   (c) a medium transfer unit for transferring said medium from said holding unit to said recording-reproducing unit; and
   (d) a management controller for managing and controlling said recording-reproducing unit, said medium transfer unit and said medium;
   wherein said recording-reproducing unit includes an automatic regulator for automatically regulating the control parameters required for reproducing or recording a signal of said medium and holding the regulated control parameters when said medium is placed on said recording-reproducing unit, and said management controller includes means for storing the control parameters automatically regulated and held by said automatic regulator and the management discrimination information for the corresponding medium and said recording-reproducing unit and in the case where said management controller processes a medium in said recording-reproducing unit, a corresponding control parameter is searched from the management discrimination information about said medium and said recording-reproducing unit, a command is issued to the automatic regulator to automatically regulate said control parameter if said control parameter is not stored, and the control parameter automatically regulated and held is stored together with the management discrimination information about said medium and said recording-reproducing unit.

4. An automatic medium changing apparatus in accordance with claim 3, wherein said recording-reproducing unit is capable of being replaced with respect to said automatic medium changing apparatus, and when said management controller detects that said recording-reproducing unit has been replaced, the stored control parameter for the previous recording-reproducing unit is erased.

5. An automatic medium changing apparatus in accordance with claim 3, wherein when said management controller detects that a medium has been replaced, the control parameter data for the previous medium are erased.

6. An automatic medium changing apparatus in accordance with claim 3, wherein said holding unit is a replaceable magazine holding a plurality of trays, and when said management controller detects that said magazine has been replaced, the control parameter data for all the media held in the replaced magazine are erased.

7. An automatic medium changing apparatus in accordance with claim 3, wherein in the case where a predetermined time has passed from the time of updating data stored in said management controller, said data are erased.

8. An automatic medium changing apparatus in accordance with claim 1, wherein said management controller causes said medium transfer unit to transfer the media contained in said apparatus sequentially to said recording-reproducing unit, automatically regulates the control parameters, and stores the automatically-regulated control parameters together with the management discrimination information for said media and said recording-reproducing unit.

9. An automatic medium changing apparatus in accordance with claim 1, wherein said recording-reproducing unit is capable of being replaced with respect to said apparatus, and when said management controller detects that said recording-reproducing unit has been replaced, said medium transfer unit sequentially transfers the media from said apparatus to the replacement recording-reproducing unit, automatically regulates the control parameter, and updates the data stored in said management controller by the control parameter obtained by said automatic regulation.

10. An automatic medium changing apparatus in accordance with claim 1, wherein when said management controller detects that said medium has been replaced, said medium transfer unit sequentially transfers the replaced media to the recording-reproducing unit, automatically regulates the control parameter, and updates the data stored in said management controller by the control parameter obtained by said automatic regulation.

11. An automatic medium changing apparatus comprising:
(a) a recording-reproducing unit capable of carrying and processing selected one of a read-only medium and a read-write medium;
(b) a holding unit for holding said medium,
(c) a medium transfer unit for transferring said medium from said holding unit to said recording-reproducing unit; and
(d) a management controller for managing and controlling said recording-reproducing unit, said medium transfer unit and said medium;
wherein said recording-reproducing unit includes an automatic regulator for automatically regulating the control parameters required for reproducing or recording a signal of said medium and holding the regulated control parameters when said medium is placed on said recording-reproducing unit, and said management controller includes means for storing the control parameters automatically regulated and held by said automatic regulator and the management discrimination information for the corresponding medium and said recording-reproducing unit and said holding unit is a magazine holding a plurality of trays carrying media and replaceable on said apparatus, and when said management controller detects that said magazine has been replaced, the trays encased in the replacement magazine are sequentially transferred to the existing recording-reproducing unit by said medium transfer unit, the control parameter is automatically regulated, and the data stored in said management controller are updated by the control parameter obtained by said automatic regulation.

12. An automatic medium changing apparatus comprising:
(a) a recording-reproducing unit capable of carrying and processing selected one of a read-only medium and a read-write medium;
(b) a holding unit for holding said medium;
(c) a medium transfer unit for transferring said medium from said holding unit to said recording-reproducing unit; and
(d) a management controller for managing and controlling said recording-reproducing unit, said medium transfer unit and said medium;
wherein said recording-reproducing unit includes an automatic regulator for automatically regulating the control parameters required for reproducing or recording a signal of said medium and holding the regulated control parameters when said medium is placed on said recording-reproducing unit, and said management controller includes means for storing the control parameters automatically regulated and held by said automatic regulator and the management discrimination information for the corresponding medium and said recording-reproducing unit and in the case where an error occurs in the course of the recording-reproducing unit processing the medium placed thereon, the automatic regulation is performed again, the medium is processed by the control parameter thus obtained, and the control parameter data stored in said management controller are updated for the combination of said medium and said recording-reproducing unit.

13. An automatic medium changing apparatus comprising:
(a) a recording-reproducing unit capable of carrying and processing selected one of a read-only medium and a read-write medium;
(b) a holding unit for holding said medium;
(c) a medium transfer unit for transferring said medium from said holding unit to said recording-reproducing unit; and
(d) a management controller for managing and controlling said recording-reproducing unit, said medium transfer unit and said medium;
wherein said recording-reproducing unit includes an automatic regulator for automatically regulating the control parameters required for reproducing or recording a signal of said medium and holding the regulated control parameters when said medium is placed on said recording-reproducing unit, and said management controller includes means for storing the control parameters automatically regulated and held by said automatic regulator and the management discrimination information for the corresponding medium and said recording-reproducing unit and in the case where a predetermined time has passed since the latest updating of the data stored in said management controller, the automatic regulation is performed for the combination of the medium and the recording-reproducing unit corresponding to the stored data, and the stored data are updated by the control parameter newly obtained by the automatic regulation.

14. An automatic medium changing apparatus in accordance with claim 13, wherein said management controller includes a stored data comparator for comparing the stored data before and after update, and in the case where the difference between the data before and after update is larger than a predetermined value, a predetermined message is displayed or a predetermined signal is output externally.

15. An automatic medium changing apparatus comprising:

(a) a recording-reproducing unit capable of carrying and processing selected one of a read-only medium and a read-write medium;

(b) a holding unit for holding said medium;

(c) a medium transfer unit for transferring said medium from said holding unit to said recording-reproducing unit; and (d) a management controller for managing and controlling said recording-reproducing unit, said medium transfer unit and said medium;

wherein said recording-reproducing unit includes an automatic regulator for automatically regulating the control parameters required for reproducing or recording a signal of said medium and holding the regulated control parameters when said medium is placed on said recording-reproducing unit, and said management controller includes means for storing the control parameters automatically regulated and held by said automatic regulator and the management discrimination information for the corresponding medium and said recording-reproducing unit the automatic medium changing apparatus further comprising a plurality of recording-reproducing units, wherein said management controller selects one of said media as a reference medium and places the reference medium on said recording-reproducing units sequentially by controlling said medium transfer unit, performing the automatic regulation by means of respective automatic regulators, and stores the resulting control parameters, the management controller stores the control parameters obtained by automatic regulation for all the media held in a reference recording-reproducing unit, when a given one of the media held is processed in said recording-reproducing units, a control parameter corresponding to said medium and said recording-reproducing unit is generated from a control parameter corresponding to said medium and said reference recording-reproducing unit, a control parameter corresponding to said reference medium and said recording-reproducing unit and a control parameter corresponding to said reference medium and said reference recording-reproducing unit, the resulting control parameter is transferred to said automatic regulator while at the same time issuing a command to said recording-reproducing unit to process said medium using said transferred control parameter without being automatically regulated by said automatic regulator.

16. An automatic medium changing apparatus comprising:

(a) a recording-reproducing unit capable of carrying and processing selected one of a read-only medium and a read-write medium;

(b) a holding unit for holding said medium;

(c) a medium transfer unit for transferring said medium from said holding unit to said recording-reproducing unit; and (d) a management controller for managing and controlling said recording-reproducing unit, said medium transfer unit and said medium unit;

wherein said recording-reproducing unit includes an automatic regulator for automatically regulating the control parameters required for reproducing or recording a signal of said medium and holding the regulated control parameters when said medium is placed on said recording-reproducing unit, and said management controller includes means for storing the control parameters automatically regulated and held by said automatic regulator and the management discrimination information for the corresponding medium and said recording-reproducing unit and the operation of said automatic medium changing apparatus can be switched between a mode in which said management controller performs the automatic regulation for all the combinations of said media and said recording-reproducing units, and stores the respective control parameters obtained by said automatic regulation together with the respective control parameters obtained by said automatic regulation together with the management discrimination information on said media and said recording-reproducing units, and a mode in which when said media are processed in said recording-reproducing units, said management discrimination information of said media and said recording-reproducing units are searched for the corresponding control parameters, and only in the case where said control parameters are not stored, a command is issued to said recording-reproducing unit to perform automatic regulation by said automatic regulator, the control parameters automatically regulated and held being stored together with the management discrimination information of said media and said recording-reproducing units.

17. An automatic medium changing apparatus in accordance with claim 1, wherein the management discrimination information of said media and said recording-reproducing units and the corresponding control parameters are stored in a nonvolatile memory.

18. A recording-reproducing apparatus comprising an automatic medium changing apparatus including a recording-reproducing unit adapted to carry and process selected one of a read-only medium and a read-write medium, a holding unit for holding said medium, a medium transfer unit for transferring said medium from said holding unit to said recording-reproducing unit, and a management controller for managing and controlling said recording-reproducing unit, said medium transfer unit and said medium, wherein said recording-reproducing unit includes an automatic regulator for automatically regulating the control parameter required for reproducing or recording the signal of said medium and holding said regulated control parameter when said medium is placed on said recording-reproducing unit, and said management controller stores the control parameter automatically regulated and held by said automatic regulator and the management discrimination information of the corresponding medium and said recording-reproducing unit, and selected one of a read-only medium and a read-write medium can be placed and processed on said apparatus, and said control parameter held in said automatic regulator can be read, written or erased from an external source, said control parameter being automatically regulated selectively by an external command.

* * * * *